(12) United States Patent
Xu

(10) Patent No.: US 9,215,550 B2
(45) Date of Patent: Dec. 15, 2015

(54) METHOD AND SYSTEM FOR SENDING MTC DEVICE TRIGGER INFORMATION, AND TARGET USER EQUIPMENT

(75) Inventor: Hui Xu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/989,294

(22) PCT Filed: Dec. 9, 2011

(86) PCT No.: PCT/CN2011/083781
§ 371 (c)(1),
(2), (4) Date: May 23, 2013

(87) PCT Pub. No.: WO2012/151981
PCT Pub. Date: Nov. 15, 2012

(65) Prior Publication Data
US 2014/0185522 A1    Jul. 3, 2014

(30) Foreign Application Priority Data

Aug. 24, 2011  (CN) .......................... 2011 1 0244251

(51) Int. Cl.
*H04W 4/00* (2009.01)
*H04W 4/20* (2009.01)
(Continued)

(52) U.S. Cl.
CPC .............. *H04W 4/005* (2013.01); *H04L 67/34* (2013.01); *H04W 4/20* (2013.01); *H04L 61/106* (2013.01); *H04L 61/1588* (2013.01); *H04L 61/6054* (2013.01)

(58) Field of Classification Search
CPC ........ H04W 4/005; H04W 4/20; H04L 67/34; H04L 61/6054; H04L 61/106; H04L 61/1588
USPC .................. 370/328, 236, 389, 392, 401, 466
See application file for complete search history.

(56) References Cited

U.S. PATENT DOCUMENTS

2011/0218911 A1*  9/2011  Spodak .......................... 705/41
2011/0244907 A1* 10/2011  Golaup et al. ................ 455/509
(Continued)

FOREIGN PATENT DOCUMENTS

| CN | 101959133 A | 1/2011 |
|----|-------------|--------|
| CN | 102118859 A | 7/2011 |

(Continued)

OTHER PUBLICATIONS

International Search Report (Form PCT/ISA/210) for PCT/CN2011/083781, mailed May 31, 2012.

*Primary Examiner* — Brian D Nguyen
(74) *Attorney, Agent, or Firm* — Koppel, Patrick, Heybl & Philpott

(57) ABSTRACT

A method and system for sending Machine Type Communication (MTC) device trigger information and target user equipment is disclosed. An MTC server sets contents of MTC device trigger information, and sends the received MTC device trigger information to a network node equipment. The network node equipment searches a core network equipment corresponding to a target user equipment, and sends the received MTC device trigger information to the core network equipment. The core network equipment forwards the MTC device trigger information to the target user equipment via a radio access network. The target user equipment receives the MTC device trigger information, and sends an MTC device trigger information acknowledgement message to the core network equipment. Through the solution of the disclosure, the sending of MTC device trigger information in a 3GPP network can be realized.

17 Claims, 4 Drawing Sheets

(51) Int. Cl.
*H04L 29/08* (2006.01)
*H04L 29/12* (2006.01)

(56) References Cited

U.S. PATENT DOCUMENTS

| | | | |
|---|---|---|---|
| 2011/0264740 A1* | 10/2011 | Diachina et al. | 709/204 |
| 2011/0280184 A1* | 11/2011 | Diachina et al. | 370/328 |
| 2012/0040643 A1* | 2/2012 | Diachina et al. | 455/411 |
| 2012/0040700 A1* | 2/2012 | Gomes et al. | 455/500 |
| 2012/0110145 A1* | 5/2012 | Pinheiro et al. | 709/220 |
| 2012/0243422 A1* | 9/2012 | Jokimies et al. | 370/242 |
| 2012/0250630 A1* | 10/2012 | Paiva et al. | 370/329 |
| 2012/0252481 A1* | 10/2012 | Anpat et al. | 455/456.1 |
| 2012/0254324 A1* | 10/2012 | Majeti et al. | 709/206 |
| 2012/0254890 A1* | 10/2012 | Li et al. | 719/313 |

FOREIGN PATENT DOCUMENTS

| | | |
|---|---|---|
| CN | 102149190 | 8/2011 |
| GB | 2476415 A | 6/2011 |

* cited by examiner

METHOD AND SYSTEM FOR SENDING MTC DEVICE TRIGGER INFORMATION, AND TARGET USER EQUIPMENT

FIELD OF THE INVENTION

The disclosure relates to the radio communication technology, in particular to a method and system for sending Machine Type Communication (abbreviated as MTC) device trigger information and target user equipment.

BACKGROUND OF THE INVENTION

Machine to Machine (abbreviated as M2M) refers to all technologies and means for establishing connection between machines. M2M concept appeared in the 1990s, but it stayed only in theoretical stage. After the year 2000, with the development of the mobile communication technology, the mobile communications technology makes the networking of the machine equipment possible. M2M service appeared in the market in about 2002 and quickly developed in the following years, it became the focus of attention from various communications equipment companies and telecommunication operators. At present, the number of global machines are much more than that of people, therefore it may be predicted that M2M technology will have good market prospect.

Researches on M2M communication application scenes show that provision of M2M communication on mobile network has potential market prospect. However, M2M service proposes a lot of new requirements on the system. In order to enhance the competitiveness of mobile network in this aspect, it is necessary to optimize the existing mobile network so as to support the M2M communication more effectively.

The existing mobile communications network is designed mainly for communication between people, while communication between machines and communication between people and machine is optimized insufficiently. Besides, how operators provide M2M communication service in low cost is also the key of successful M2M communication deployment.

On the basis of the above conditions, it is necessary to have researches on the solution of how the mobile network supports M2M communication, the solution should reuse the existing network maximally, in order to reduce the impact on the network due to a large amount of M2M communication and reduce the complexity of operation and maintenance.

At present, competition goes increasingly fierce in the telecommunication market. Charge drops continuously, the profit margin declines continuously, and the people-oriented communications market is becoming saturated, so M2M is a new development opportunity for operators.

In order to utilize the mobile network resources effectively, 3rd Generation Partnership Project (abbreviated as 3GPP) proposes Machine Type Communication (abbreviated as MTC), i.e., communication services of Machine to Machine or Machine to Man, the service range goes far beyond the communication between Human to Human (abbreviated as H2H). MTC has great difference with the existing H2H communication mode in aspects such as access control, charging, security, Quality of Service (abbreviated as QoS), service mode or the like.

In 3GPP Evolved Packet System (abbreviated as EPS) architecture, EPS includes radio access network (such as, Universal Terrestrial Radio Access Network (abbreviated as UMTS), Evolved UTRAN (abbreviated as E-UTRAN), GSM/EDGE Radio Access Network (abbreviated as GERAN)) and core network. For example, the Evolved Packet Core (abbreviated as EPC) network includes network elements such as Mobility Management Entity (abbreviated as MME), Serving Gateway, Packet Data Network (abbreviated as PDN) Gateway (abbreviated as PGW) or the like; the GPRS core network includes network elements such as Serving GPRS Support Node (abbreviated as SGSN); and the E-UTRAN includes Evolved Node B (abbreviated as eNB).

MTC Device Trigger is one of basic requirements on the MTC system, the problem on which this requirement focuses is: in order to control communication of the MTC device, communication may be performed in such a manner that an MTC server initiates polling, and for the communication initiated by the MTC device, sometimes it is needed that the MTC server polls data from the MTC device. If the MTC server fails to query or the IP address of the MTC device is unavailable, the MTC server may use MTC device trigger to establish communication with the MTC device. If the network is unable to trigger the MTC device, the network reports MTC device trigger failure to the MTC server and the MTC device trigger is realized in 3GPP via control plane signaling.

MTC device trigger includes Mobile Originated (abbreviated as MO) services and Mobile Terminating (abbreviated as MT) services, that is, it includes that the MTC device sends or receives information.

In order to realize effective transmission of MTC device trigger request, the following solutions have been proposed: sending MTC device trigger information via short message (SMS), or sending MTC device trigger information via control plane signaling. For the mode of sending MTC device trigger information via control plane signaling, the MTC server sends a control plane signaling containing MTC device trigger information to the network node, the network node parses the MTC device trigger information in the control plane signaling and then sends the MTC device trigger information to User Equipment (abbreviated as UE). The MTC architecture in 3GPP is shown in FIG. 1. In the user plane, the MTC application equipment (Application) which connects with the MTC user (User) communicates with the MTC server via an API interface, or directly communicates with the Gateway GPRS Support Node (abbreviated as GGSN)/PGW/Evolved Packet Data Gateway (abbreviated as EPDG) via a Gi/SGi interface; the MTC server communicates with GGSN/PGW/EPDG via an MTCi interface; the GGSN/PGW/EPDG communicates with the User Equipment (abbreviated as UE) via RAN. In the control plane, the MTC server sends a control plane signaling containing MTC device trigger information to the MTC InterWorking Function (abbreviated as MTC-IWF) via an MTCsp interface or sends a control plane signaling containing MTC device trigger information to the Short Message Service-Service Centre (abbreviated as SMS-SC)/IP-Short-Message-Gateway (abbreviated as IP-SM-GW) via an MTCsms interface; the MTC-IWF or the SMS-SC/IP-SM-GW sends the control plane signaling to the MME/SGSN or Gateway MSC for Short Message Service (abbreviated as SMS-GMSC) or short message service router (abbreviated as SMS Router) or Mobile-services Switching Centre(abbreviated as MSC) or Visitor Location Register (abbreviated as VLR), further to send the control plane signaling to the UE via RAN; wherein, the MME/SGSN also can obtain the control plane signaling from a Home Subscriber Server (abbreviated as HSS) or Home Location Register (abbreviated as HLR) (HSS/HLR) via a Gr/S6a/S6d interface.

FIG. 2 is a schematic diagram that the MTC server sends a control plane signaling containing MTC device trigger information via the SMS-SC/IP-SM-GW, wherein the MTC server directly sends a control plane signaling containing MTC device trigger information to the SMS-SC/IP-SM-GW via the MTCsms interface, and then the SMS-SC/IP-SM-GW transmits the MTC device trigger information via the SMS-GMSC, SMS Router, MSC/VLR or SGSN in turn and finally sends it to the UE.

However, at present, in the control plane of the MTC architecture in the 3GPP, as the contents of MTC device trigger information are not determined and there is no solution for processing the MTC device trigger information by the 3GPP network node, requirements on the transmission of MTC device trigger information in the 3GPP network cannot be met.

SUMMARY OF THE INVENTION

Therefore, the disclosure provides a method and system for sending MTC device trigger information and target UE, to realize the sending of MTC device trigger information in the 3GPP network.

To achieve the above purpose, the technical solution of the disclosure is realized as follows.

The disclosure provides a method for sending MTC device trigger information, including: an MTC server sets contents of the MTC device trigger information, and sends the MTC device trigger information to a network node equipment; the network node equipment searches a core network equipment corresponding to a target UE, and sends the received MTC device trigger information to the core network equipment; the core network equipment forwards the MTC device trigger information to the target UE via an RAN; and the target UE receives the MTC device trigger information, and sends an MTC device trigger information acknowledgement message to the core network equipment.

In the solution above, the contents of the MTC device trigger information includes: an MTC device ID and an MTC device trigger validity period.

In the solution above, the MTC device ID is an external ID of 3rd Generation Partnership Project (3GPP) network, a corresponding network internal ID of the 3GPP is International Mobile Subscriber Identity (IMSI), and the mapping between the external ID and the internal ID is completed by an MTC InterWorking Function (MTC-IWF), or a Home Subscriber Server (HSS), or an Home Location Register (HLR).

In the solution above, the contents of the MTC device trigger information further includes at least one of the following: an application identifier, priority of the MTC device trigger information, an IP address of the MTC server, port and MTC device trigger reference number.

In the solution above, the step of sending the MTC device trigger information to a network node equipment includes: the internal identifier of the 3GPP network IMSI is derived according to the MTC device identifier in the contents of the MTC device trigger information, the network node equipment corresponding to the target user equipment is searched according to the internal identifier of the 3GPP network IMSI, and the MTC device trigger information is send to the network node equipment.

In the solution above, the network node equipment searches a core network equipment corresponding to a target user equipment and sends the received MTC device trigger information to the core network equipment includes: the network node equipment receives the MTC device trigger information, modifies the MTC device identifier in the contents of the MTC device trigger information to the internal identifier of the 3GPP network IMSI, searches the core network equipment corresponding to the target user equipment via the HSS or the HLR, and sends the MTC device trigger information to the core network equipment.

In the solution above, the method further includes: the network node equipment resends the MTC device trigger information after failing to send the MTC device trigger information.

In the solution above, the method further includes: before the network node equipment resends the MTC device trigger information, the network node equipment determines whether to delete the MTC device trigger information according to the MTC device trigger validity period in the contents of the MTC device trigger information.

In the solution above, the core network equipment forwards the MTC device trigger information to the target user equipment via the radio access network includes: the core network equipment forwards the MTC device trigger information to the target user equipment via page message, or broadcast message System Information Block (SIB), or signaling connection being performed in the radio access network.

In the solution above, the method further includes: the core network equipment forwards the MTC device trigger information immediately when the priority of the MTC device trigger information in the contents of the MTC device trigger information is emergency.

In the solution above, the method further includes: before the core network equipment resends the MTC device trigger information the core network equipment determines whether to delete the MTC device trigger information according to the MTC device trigger validity period in the contents of the MTC device trigger information.

In the solution above, the method further includes: after the target user equipment sends the MTC device trigger information acknowledgment message to the core network equipment, the target user equipment judges whether the MTC device trigger information is repeated according to the MTC device trigger reference number information in the contents of the MTC device trigger information, if not repeated, requests to establish a Packet Data Network (PDN) connection or to activate a Packet Data Protocol (PDP) context.

In the solution above, the method further includes: the target user equipment establishes application-layer communication with the MTC server according to the address of the MTC server and the port information in the contents of the MTC device trigger information.

In the solution above, the network node equipment includes: an MTC-IWF, an HSS, an HLR, a Short Message Service-Service Centre (SMS-SC), or an IP-Short-Message-Gateway (IP-SM-GW); and the core network equipment includes: a Mobility Management Entity (MME), a Serving General Packet Radio Service (GPRS), a Support Node (SGSN), a Mobile-services Switching Centre Gateway for Short Message Service (SMS-GMSC), a Short Message Service Router (SMS Router), or a Mobile-services Switching Centre (MSC).

The disclosure provides a system for sending MTC device trigger information, including: an MTC server, a network node equipment, a core network equipment and a target user equipment, wherein the MTC server is configured to set contents of the MTC device trigger information, and send the MTC device trigger information to the network node equipment; the network node equipment is configured to search a core network equipment corresponding to the target user equipment, and send the received MTC device trigger information to the core network equipment; the core network equipment is configured to forward the MTC device trigger information to the target user equipment via a Radio Access Network; the target user equipment is configured to receive the MTC device trigger information, and send an MTC device trigger information acknowledgement message to the core network equipment.

In the solution above, the network node equipment is configured to receive the MTC device trigger information, modify the MTC device identifier in the contents of the MTC device trigger information to internal identifier of 3GPP network IMSI, search a core network equipment corresponding to the target user equipment via an HSS or an HLR, and send the MTC device trigger information to the core network equipment.

The disclosure provides target UE, and the target UE includes a receiving unit and a sending unit, wherein, the receiving unit is configured to receive MTC device trigger information sent by a core network equipment, wherein the contents of the MTC device trigger information is setting by an MTC server; the sending unit is configured to send an MTC device trigger information acknowledgement message to the core network equipment.

The disclosure provides a method and system for sending MTC device trigger information and a target UE. An MTC server sets contents of MTC device trigger information, and sends the MTC device trigger information to a network node equipment; the network node equipment searches a core network equipment corresponding to the target UE, and sends the received MTC device trigger information to the core network equipment; the core network equipment forwards the MTC device trigger information to the target UE; the target UE receives the MTC device trigger information, and sends an MTC device trigger information acknowledgement message to the core network equipment. In this way, the sending of MTC device trigger information in a 3GPP network can be realized, and the contents of the MTC device trigger information and the solution for processing the MTC device trigger information by the network node equipment are determined.

DETAILED DESCRIPTION OF THE EMBODIMENTS

According to one aspect of the disclosure, MTC server sets contents of MTC device trigger information, and sends the MTC device trigger information to a network node equipment; the network node equipment searches a core network equipment corresponding to target user equipment (abbreviated as UE), and sends the received MTC device trigger information to the core network equipment; the core network equipment forwards the MTC device trigger information to the target UE via RAN; the target UE receives the MTC device trigger information, and sends an MTC device trigger information acknowledgement message to the core network equipment.

The disclosure will be further described in details below with reference to drawings and specific embodiments.

Figure 1:
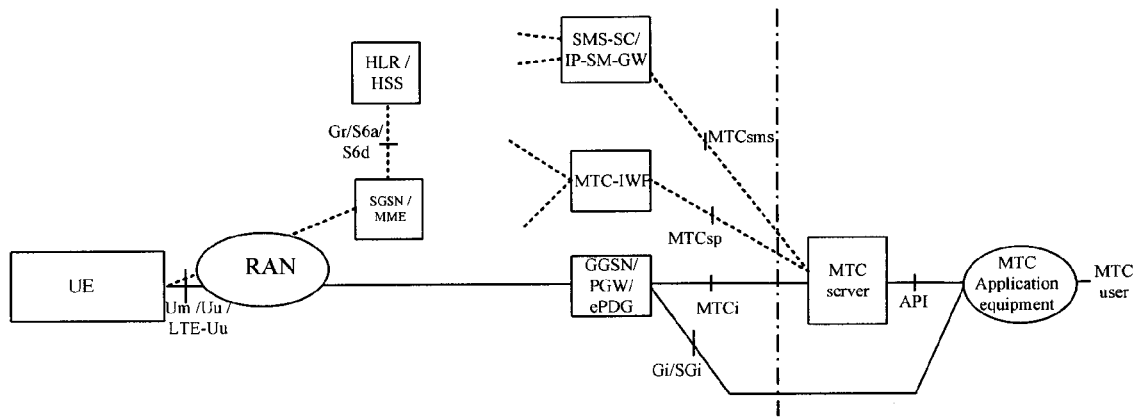
FIG. 1 is an MTC architecture schematic diagram in 3GPP in the conventional art.
Figure 2:
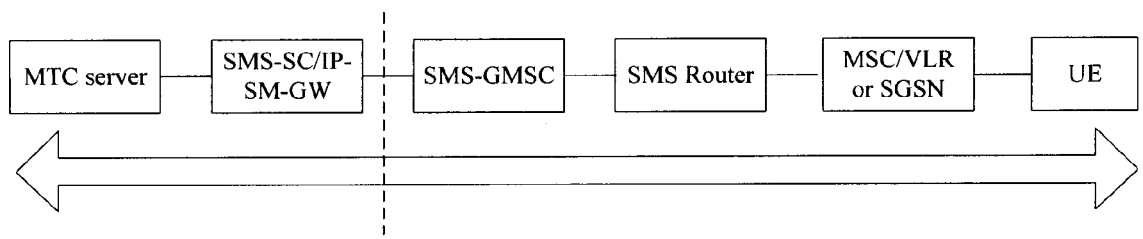
FIG. 2 is a schematic diagram that the MTC server sends a control plane signaling containing MTC device trigger information via the SMS-SC/IP-SM-GW in the conventional art.
Figure 3:
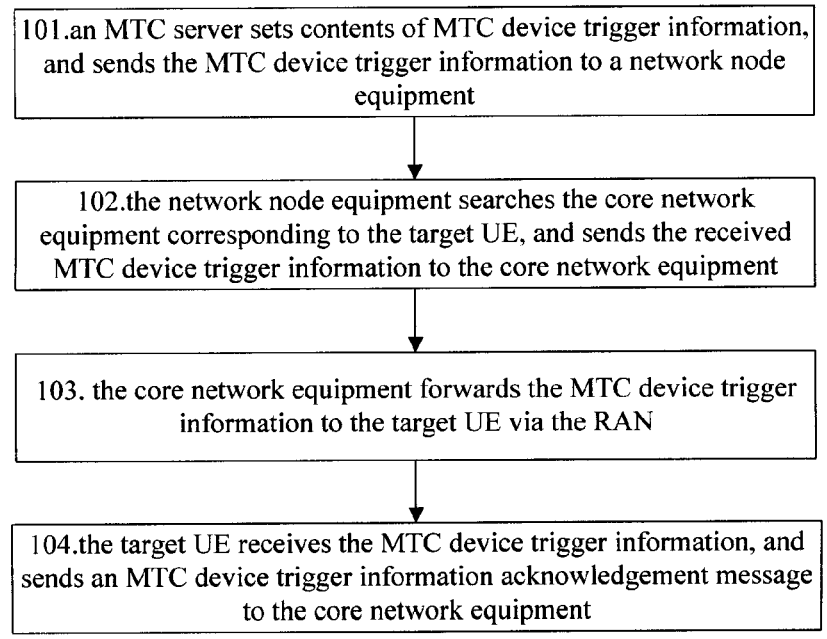
FIG. 3 is a flow chart of a method for sending MTC device trigger information in the disclosure.

The disclosure realizes a method for sending MTC device trigger information, and as shown in FIG. 3, the method includes the following steps.

Step 101: an MTC server sets contents of MTC device trigger information, and sends the MTC device trigger information to a network node equipment.

Specifically, the MTC server sets contents of the MTC device trigger information, derives the internal identifier of the 3GPP network IMSI according to the MTC device ID in the contents of the MTC device trigger information, searches the network node equipment corresponding to the target UE according to the internal of the 3GPP network IDIMSI, and sends the MTC device trigger information to the network node equipment.

The MTC server is located outside or within the 3GPP network. The contents of the MTC device trigger information contain: MTC device identifier (abbreviated as Device ID) and MTC device trigger validity period; further, the contents of the MTC device trigger information also contain at least one of the following: Application identifier (abbreviated as APP ID), priority of the MTC device trigger information, MTC server IP address, port and MTC device trigger reference number or the like.

The MTC device identifier is used for identifying the target UE. The MTC device identifier is a external identifier of the 3GPP network, the corresponding the internal identifier of the 3GPP network is IMSI, and the mapping between the external identifier and the internal identifier is completed by the MTC-IWF or the HSS/HLR. Further, in order to realize MTC device trigger for a plurality of target UEs, the MTC device identifier also may be a group identifier (group ID. The MTC device trigger validity period is used for indicating the time for deleting the MTC device trigger information. The APP ID is used for identifying the subscribed application needed on the target UE. The priority of the MTC device trigger information is used for showing whether the MTC device trigger information is emergency or common. The MTC server IP address and port are used for identifying the address and port of the MTC server initiating the MTC device trigger information; and the MTC device trigger reference number is used for indicating whether it is repeated trigger request information.

Further, when the contents of the MTC device trigger information contain APP ID, the MTC server also may derive the internal ID of the 3GPP network IMSI according to the APP ID in the contents of the MTC device trigger information.

The network node equipment is located in the 3GPP network, and it may be any one of the following: MTC-IWF, HSS/HLR, SMS-SC and IP-SM-GW.

Step 102: the network node equipment searches the core network equipment corresponding to the target UE, and sends the received MTC device trigger information to the core network equipment.

Specifically, the network node equipment receives the MTC device trigger information, modifies the MTC device ID in the contents of the MTC device trigger information to the internal ID of the 3GPP network IMSI, searches the core network equipment corresponding to the target UE via the HSS or the HLR, and sends the MTC device trigger information to the core network equipment. When the network node equipment is HSS/HLR, the HSS/HLR searches the core network equipment corresponding to the target UE via local records.

The core network equipment is generally MME or SGSN (MME/SGSN) or SMS-GMSC or SMS router or MSC.

The SMS-GMSC or SMS router or MSC is the core network equipment to which the SMS-SC or IP-SM-GW is corresponding when the MTC device trigger information is sent by means of SMS.

This step (Step 102) further includes: the network node equipment resends the MTC device trigger information after failing to send the MTC device trigger information. Further, before resending the MTC device trigger information, the network node equipment determines whether to delete the MTC device trigger information according to the MTC device trigger validity period in the contents of the MTC device trigger information. That is, when the MTC device trigger validity period is reached, the network node equipment deletes the MTC device trigger information, performs no resending operation, and notifies the MTC server.

Step 103: the core network equipment forwards the MTC device trigger information to the target UE via the RAN.

Specifically, the core network equipment forwards the MTC device trigger information to the target UE via page message, or broadcast message SIB, or signaling connection being performed in the RAN. The signaling connection may be: dedicated Non Access Stratum (NAS) messaging process, such as DOWNLINK GENERIC NAS TRANSPORT message and UPLINK GENERIC NAS TRANSPORT message, and the RAN refers to eNB.

This step further includes: the core network equipment determines whether to forward the MTC device trigger information immediately according to the priority of the MTC device trigger information in the contents of the MTC device trigger information, if the priority of the MTC device trigger information is emergency, the core network equipment forwards the MTC device trigger information immediately.

This step also includes: after failing to send the MTC device trigger information due to the congestion or overload of the network, the core network equipment resends the MTC device trigger information. Further, before the core network equipment resends the MTC device trigger information, the core network equipment determines whether to delete the MTC device trigger information according to the MTC device trigger validity period in the contents of the MTC device trigger information, that is, when the MTC device trigger validity period is reached, the core network equipment deletes the MTC device trigger information, performs no resending operation, and notifies the MTC server.

Step 104: the target UE receives the MTC device trigger information, and sends an MTC device trigger information acknowledgement message to the core network equipment.

This step further includes: after the target UE sends the MTC device trigger information acknowledgment message to the core network equipment, the target UE judges whether the MTC device trigger information is repeated according to the MTC device trigger reference number information in the contents of the MTC device trigger information, if repeated, the flow is ended, if not repeated, the target UE may request to establish a PDN connection or to activate the PDP context, and if the PDN connection exists, the target UE need not to re-establish a PDN connection.

Further, the target UE establishes application-layer communication with the MTC server according to the address of the MTC server and the port information in the contents of the MTC device trigger information.

In order to realize the above method, the disclosure provides a system for sending MTC device trigger information.

Figure 4:
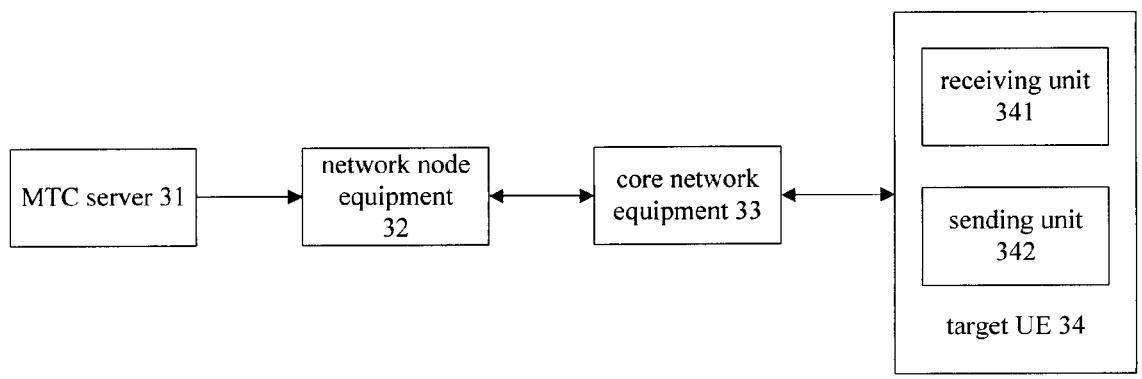
FIG. 4 is a structure schematic diagram of a system for sending MTC device trigger information in the disclosure.

As shown in FIG. 4, the system includes: an MTC server 31, a network node equipment 32, a core network equipment 33 and a target UE 34.

The MTC server 31 is configured to set contents of MTC device trigger information, and send the MTC device trigger information to the network node equipment 32.

The MTC server 31 is specifically configured to set contents of MTC device trigger information, derive the internal ID of the 3GPP network IMSI according to the MTC device ID in the contents of the MTC device trigger information, search the network node equipment 32 corresponding to the target UE according to the internal ID of the 3GPP network IMSI, and send the MTC device trigger information to the network node equipment 32.

The contents of the MTC device trigger information contain: MTC device ID and MTC device trigger validity period.

Further, the contents of the MTC device trigger information also contain at least one of the following: APP ID, priority of the MTC device trigger information, MTC server IP address, port, MTC device trigger reference number or the like.

The network node equipment 32 is configured to search the core network equipment 33 corresponding to the target UE 34, and sends the received MTC device trigger information to the core network equipment 33.

The network node equipment 32 is specifically configured to receive the MTC device trigger information, modify the MTC device ID in the contents of the MTC device trigger information to the internal ID of the 3GPP network IMSI, search the core network equipment 33 corresponding to the target UE 34 via the HSS or the HLR, and send the MTC device trigger information to the core network equipment 33.

The network node equipment 32 is further configured to resend the MTC device trigger information after failing to send the MTC device trigger information.

Further, the network node equipment 32 is also configured to, before resending the MTC device trigger information, determine whether to delete the MTC device trigger information according to the MTC device trigger validity period in the contents of the MTC device trigger information.

The core network equipment 33 is configured to forward the MTC device trigger information to the target UE 34 via the RAN.

The core network equipment 33 is specifically configured to forward the MTC device trigger information to the target UE 34 via page message, or broadcast message SIB, or signalling connection being performed in the RAN.

Further, the core network equipment 33 is also configured to determine whether to forward the MTC device trigger information immediately according to the priority of the MTC device trigger information in the contents of the MTC device trigger information.

The core network equipment 33 is also configured to, after failing to send The MTC device trigger information due to congestion or overload of network, resend the MTC device trigger information.

Further, the core network equipment 33 is also configured to, before resending the MTC device trigger information, determine whether to delete the MTC device trigger information according to the MTC device trigger validity period in the contents of the MTC device trigger information.

The target UE 34 is configured to receive the MTC device trigger information, and send an MTC device trigger information acknowledgement message to the core network equipment 33.

The target UE 34 is also configured to, after sending an MTC device trigger information acknowledgment message to the core network equipment 33, judge whether the MTC device trigger information is repeated according to the MTC device trigger reference number information in the contents of the MTC device trigger information, if repeated, the flow is ended, if not repeated, the target UE 34 requests to establish a PDN connection or to activate the PDP context, and if the PDN connection exists, the target UE 34 does not re-establish the PDN connection.

The target UE 34 includes a receiving unit 341 and a sending unit 342. The receiving unit 341 is configured to receive the MTC device trigger information sent by the core network equipment 33, wherein the contents of the MTC device trigger information is set by the MTC server 31.

The sending unit 342 is configured to send an MTC device trigger information acknowledgement message to the core network equipment 33.

On basis of the above system, the disclosure also provides a target UE, and as shown in FIG. 4, the target UE 34 includes a receiving unit 341 and a sending unit 342.

The receiving unit 341 is configured to receive the MTC device trigger information sent by the core network equipment 33, wherein the contents of the MTC device trigger information is set by the MTC server 31.

The sending unit 342 is configured to send an MTC device trigger information acknowledgement message to the core network equipment 33.

The process and principle of implementing the method in the disclosure will be described in details with specific embodiments.

Embodiment 1

Figure 5:
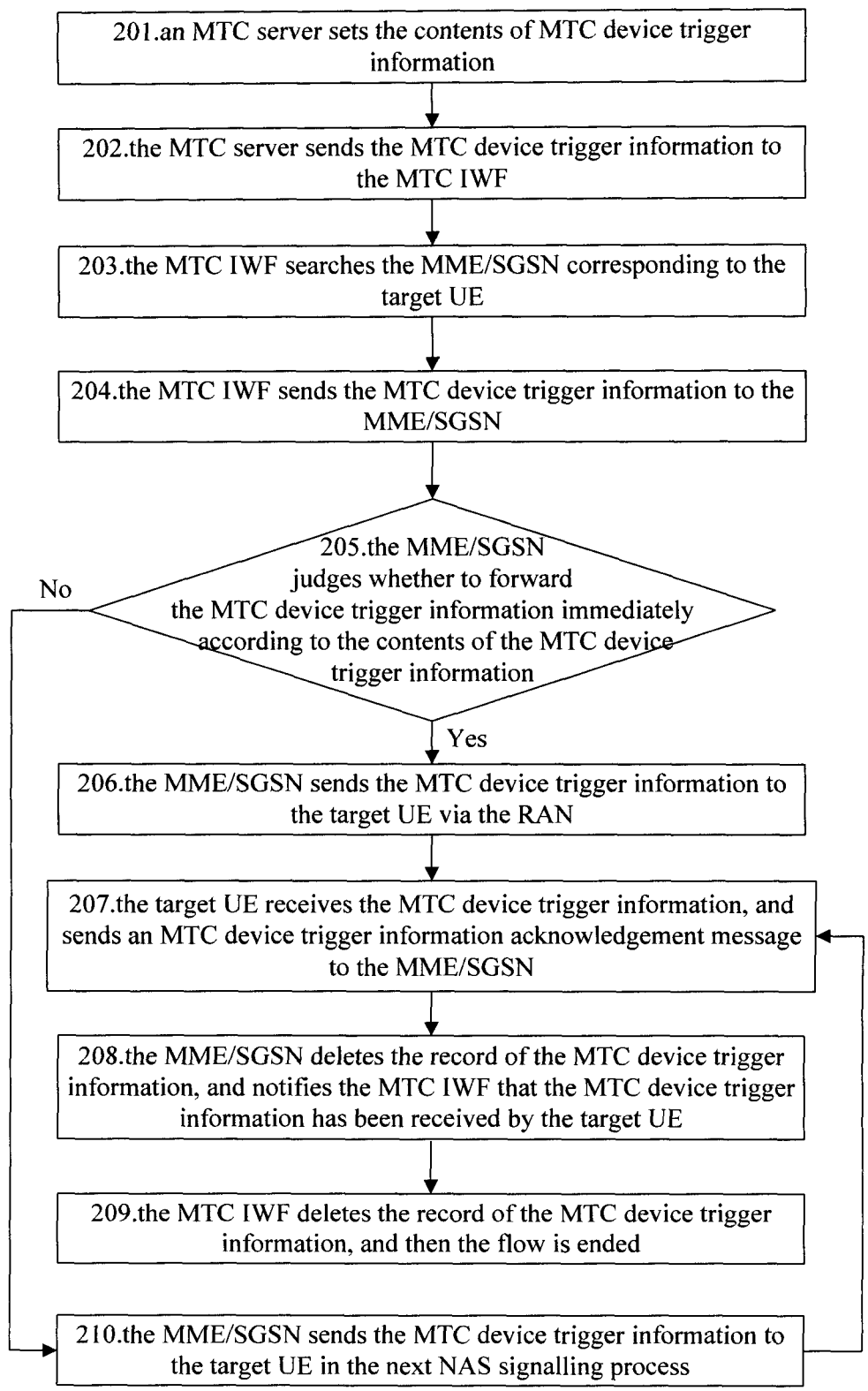
FIG. 5 is a flow chart of a method for sending MTC device trigger information in the embodiment 1 of the disclosure.

In the embodiment, in allusion to a scene in which the MTC device trigger information is sent via the MTC-IWF to realize the method for sending MTC device trigger information, as shown in FIG. 5, the method includes the following steps.

Step 201: an MTC server sets the contents of MTC device trigger information.

In this step, the contents of the MTC device trigger information contain: MTC device identifier and MTC device trigger validity period.

Further, the contents of the MTC device trigger information also contain at least one of the following: application identifier, priority of the MTC device trigger information, MTC server IP address, port and MTC device trigger reference number.

The MTC server derives the internal ID of the 3GPP network IMSI according to the MTC device ID and/or the APP ID in the MTC device trigger information, and searches the MTC-IWF corresponding to the target UE according to the internal ID of the 3GPP network.

Step 202: the MTC server sends the MTC device trigger information to the MTC-IWF.

Specifically, the MTC server sends the MTC device trigger information to the MTC-IWF via an MTCsp interface; the MTC device trigger information is borne by the control signaling on the MTCsp interface.

Step 203: the MTC-IWF searches the MME/SGSN corresponding to the target UE.

Specifically, the MTC-IWF modifies the MTC device ID in the MTC device trigger information to the internal ID of the 3GPP network IMSI, and searches via the HSS/HLR to obtain the MME/SGSN corresponding to the target UE.

Herein, a communication interface is established between the MTC-IWF and the HSS/HLR.

Step 204: the MTC-IWF sends the MTC device trigger information to the MME/SGSN.

In this step, if the MME/SGSN is serving the target UE, the MTC-IWF sends the MTC device trigger information to the MME/SGSN immediately, or otherwise the MTC-IWF sends the MTC device trigger information after the UE is registered to the MME/SGSN.

When the MTC-IWF fails to send the MTC device trigger information to the MME/SGSN, the MTC-IWF resends the MTC device trigger information; it should be noted that, before the MTC-IWF resends the MTC device trigger information, the MTC-IWF needs to judge whether the MTC device trigger validity period is overtime, if so, the MTC-IWF stops resending, deletes the record of the MTC device trigger information and notifies the MTC server.

Step 205: the MME/SGSN judges whether to forward the MTC device to trigger information immediately according to the contents of the MTC device trigger information, if so, the Step 206 is executed, otherwise the Step 210 is executed Specifically, the MME/SGSN may judge whether need to forward the trigger information immediately according to the priority of the MTC device trigger information in the contents of the MTC device trigger information. When the priority is emergency, the trigger information needs to be sent immediately, and the Step 206 is executed; when the priority is common, the Step 210 is executed.

Step 206: the MME/SGSN sends the MTC device trigger information to the target UE via the RAN.

The target UE may be any one of the following: UE, mobile equipment, mobile station or the like. And the target UE is generally equipped with a function of supporting the MTC feature.

The MTC device trigger information is sent via page message, or broadcast message SIB bearer, or signaling connection being performed, wherein the signaling connection may be a dedicated NAS messaging process.

Further, when the MME/SGSN fails to send the MTC device trigger information to the UE via the RAN, for example, when the MME/SGSN fails to send the MTC device trigger information due to congestion or overload of the network, the MME/SGSN resends the MTC device trigger information. Herein, before the MME/SGSN resends the MTC device trigger information, the MME/SGSN judges whether the MTC device trigger validity period is overtime, if so, the MME/SGSN stops resending, deletes the record of the MTC device trigger information and notifies the MTC-IWF. Further, the MTC-IWF notifies the MTC server.

Step 207: the target UE receives the MTC device trigger information, and sends an MTC device trigger information acknowledgement message to the MME/SGSN.

This step further includes: after the target UE sends an MTC device trigger information acknowledgment message to the MME/SGSN, the target UE judges whether the MTC device trigger information is repeated according to the MTC device trigger reference number information in the contents of the MTC device trigger information, if repeated, the flow is ended, and if not repeated, the target UE requests to establish a PDN connection or to activate the PDP context.

Further, the target UE establishes application-layer communication with the MTC server according to the address of the MTC server and the port information in the contents of the MTC device trigger information.

Step 208: the MME/SGSN deletes the record of the MTC device trigger information, and notifies the MTC-IWF that the MTC device trigger information has been received by the target UE.

Herein, the MME and the SGSN may send an acknowledgement message indicating that the MTC device trigger information has been received by the target UE to the MTC-IWF simultaneously or respectively.

Step 209: the MTC-IWF deletes the record of the MTC device trigger information, and then the flow is ended.

After the MTC-IWF receives the acknowledgement message indicating that the MTC device trigger information has been received by the target UE from the MME and/or SGSN, the MTC-IWF deletes the local record of the trigger information.

Step 210: the MME/SGSN sends the MTC device trigger information to the target UE in the next NAS signaling process, and then the Step 207 is executed.

The NAS signaling process may be any one of the following messaging processes: Attach process, TAU/RAU process or the like.

Embodiment 2

Figure 6:
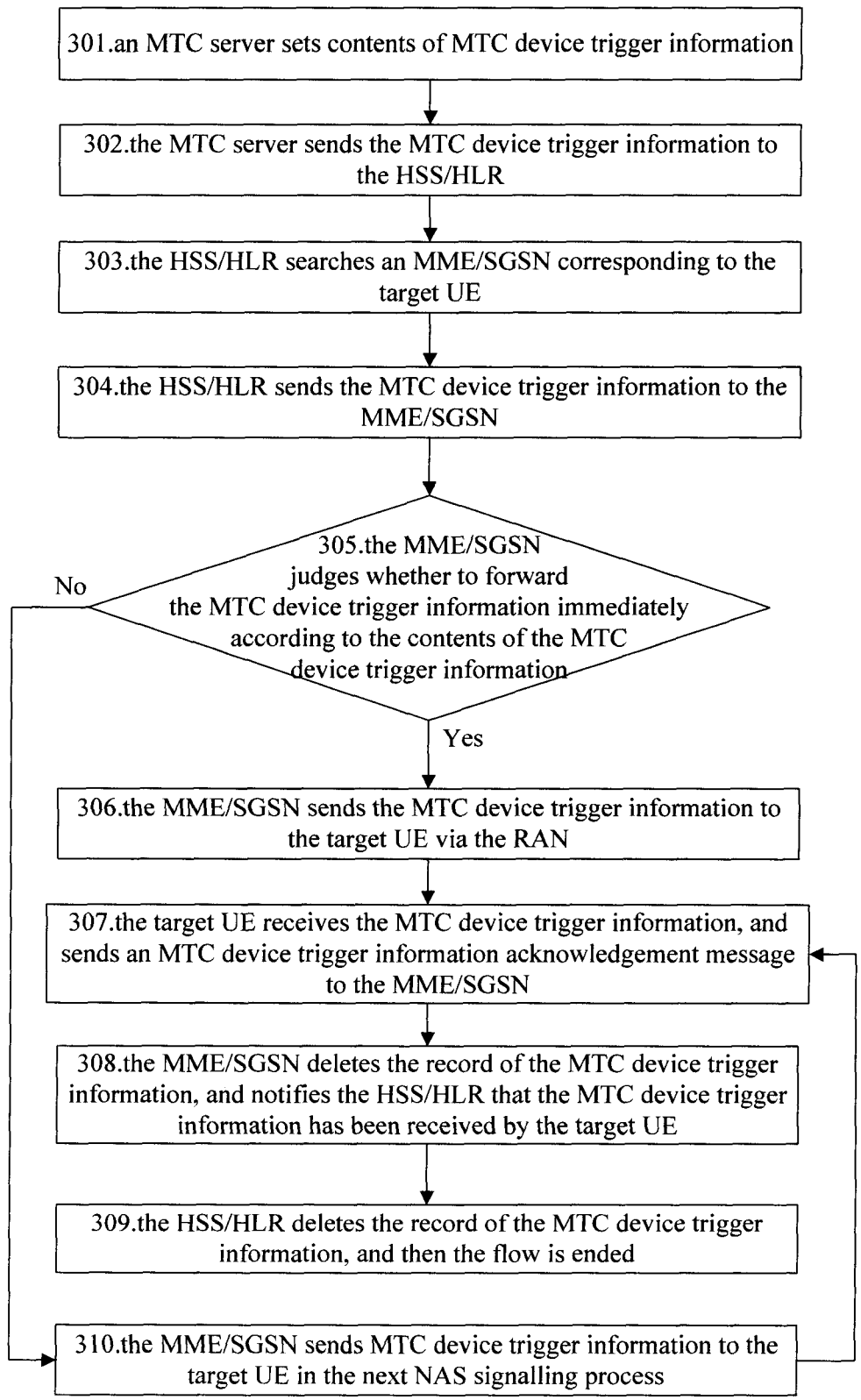
FIG. 6 is a flow chart of a method for sending MTC device trigger information in the embodiment 2 of the disclosure.

In the embodiment, in allusion to a scene in which the MTC device trigger information is sent via the HSS/HLR to realize the method for sending MTC device trigger information, as shown in FIG. 6, the method includes the following steps.

Step 301: an MTC server sets contents of MTC device trigger information.

This step is the same as Step 201, which will not be described again.

Step 302: the MTC server sends the MTC device trigger information to the HSS/HLR.

An interface exits between the MTC server and the HSS/HLR.

Step 303: the HSS/HLR searches an MME/SGSN corresponding to the target UE.

Specifically, the HSS/HLR modifies the MTC device ID in the MTC device trigger information to the internal ID of the 3GPP network IMSI, searches via the local records to obtain the MME/SGSN corresponding to the target UE.

Step 304: the HSS/HLR sends the MTC device trigger information to the MME/SGSN.

In this step, if the MME/SGSN is serving the target UE, the HSS/HLR sends the MTC device trigger information to the MME/SGSN immediately; otherwise the HSS/HLR sends the MTC device trigger information after the UE is registered to the MME/SGSN.

When the HSS/HLR fails to send the MTC device trigger information to the MME/SGSN, the HSS/HLR resends the MTC device trigger information. It should be noted that, before the HSS/HLR resends the MTC device trigger information, the HSS/HLR needs to judge whether the MTC device trigger validity period is overtime, if so, the HSS/HLR stops resending, deletes the record of the MTC device trigger information and notifies the MTC server.

Step 305: the MME/SGSN judges whether to forward the MTC device trigger information immediately according to the contents of the MTC device trigger information, if so, the Step 306 is executed, and otherwise the Step 310 is executed.

Specifically, the MME/SGSN may judge whether need to forward the trigger information immediately according to the priority of the MTC device trigger information in the contents of the MTC device trigger information, when the priority is emergency, the trigger information needs to be sent immediately, and the Step 306 is executed, when the priority is common, the Step 310 is executed.

Step 306: the MME/SGSN sends the MTC device trigger information to the target UE via the RAN.

This step is the same as Step 206, which will not be described again.

Step 307: the target UE receives the MTC device trigger information, and sends an MTC device trigger information acknowledgement message to the MME/SGSN; this step is the same as Step 206, which will not be described again.

Step 308: the MME/SGSN deletes the record of the MTC device trigger information, and notifies the HSS/HLR that the MTC device trigger information has been received by the target UE.

Step 309: the HSS/HLR deletes the record of the MTC device trigger information, and then the flow is ended.

After the HSS/HLR receives the acknowledgement message indicating that the MTC device trigger information has been received by the target UE from the MME and/or SGSN, the HSS/HLR deletes the local record of the trigger information.

Step 310: the MME/SGSN sends MTC device trigger information to the target UE in the next NAS signaling process, and then the Step 307 is executed; this step is the same as Step 210, which will not be described again.

Through the above solution, the sending of MTC device trigger information in a 3GPP network can be realized, and the contents of the MTC device trigger information and the solution for processing the MTC device trigger information by the network node equipment are determined.

The above contents just describe the preferred embodiments of the disclosure and are not used for limiting the protection scope of the disclosure.

What is claimed is:

1. A method for sending Machine Type Communication (MTC) device trigger information, comprising:
   an MTC server setting contents of the MTC device trigger information and sending the MTC device trigger information to a network node equipment;
   the network node equipment searching a core network equipment corresponding to a target user equipment and forwarding the MTC device trigger information to the core network equipment;
   the core network equipment forwarding the MTC device trigger information to the target user equipment via a Radio Access Network (RAN); and
   the target user equipment receiving the MTC device trigger information and sending an MTC device trigger information acknowledgement message to the core network equipment;
   wherein the contents of the MTC device trigger information comprises: an MTC device identifier and an MTC device trigger validity period;
   wherein the MTC device identifier is an external identifier of 3rd Generation Partnership Project (3GPP) network, a corresponding internal identifier of the 3GPP network is International Mobile Subscriber Identity (IMSI), and the mapping between the external identifier and the internal identifier is completed by an MTC InterWorking Function (MTC-IWF), or a Home Subscriber Server (HSS), or a Home Location Register (HLR);
   wherein sending the MTC device trigger information to the network node equipment comprises: deriving the internal identifier of the 3GPP network IMSI, according to the MTC device identifier in the contents of the MTC device trigger information, searching the network node equipment corresponding to the target user equipment according to the internal identifier of the 3GPP network IMSI, and sending the MTC device trigger information to the network node equipment.

2. The method according to claim 1, wherein the contents of the MTC device trigger information comprises at least one of the following: an application identifier, priority of the MTC device trigger information, an IP address of the MTC server, port and MTC device trigger reference number.

3. The method according to claim 2, wherein the network node equipment searching a core network equipment corresponding to a target user equipment and sending the MTC device trigger information to the core network equipment comprises:

the network node equipment receiving the MTC device trigger information, modifying the MTC device identifier in the contents of the MTC device trigger information to the internal identifier of the 3GPP network IMSI, searching the core network equipment corresponding to the target user equipment via the HSS or the HLR, and sending the MTC device trigger information to the core network equipment.

4. The method according to claim 3, further comprising: the network node equipment resending the MTC device trigger information after failing to send the MTC device trigger information.

5. The method according to claim 2, further comprising: before the network node equipment resends the MTC device trigger information, the network node equipment determining whether to delete the MTC device trigger information according to the MTC device trigger validity period in the contents of the MTC device trigger information.

6. The method according to claim 2, wherein the core network equipment forwarding the MTC device trigger information to the target user equipment via the radio access network comprises: the core network equipment forwarding the MTC device trigger information to the target user equipment via page message, or broadcast message System Information Block (SIB), or signalling connection being performed in the radio access network.

7. The method according to claim 6, further comprising: the core network equipment forwarding the MTC device trigger information immediately when the priority of the MTC device trigger information in the contents of the MTC device trigger information is emergency.

8. The method according to claim 6, further comprising: before the core network equipment resends the MTC device trigger information the core network equipment determining whether to delete the MTC device trigger information according to the MTC device trigger validity period in the contents of the MTC device trigger information.

9. The method according to claim 2, further comprising: after the target user equipment sends the MTC device trigger information acknowledgment message to the core network equipment, the target user equipment judging whether the MTC device trigger information is repeated according to the MTC device trigger reference number information in the contents of the MTC device trigger information, if not repeated, requesting to establish a Packet Data Network (PDN) connection or to activate a Packet Data Protocol (PDP) context.

10. The method according to claim 2, further comprising: the target user equipment establishing application layer communication with the MTC server according to the address of the MTC server and the port information in the contents of the MTC device trigger information.

11. The method according to claim 2, wherein
the network node equipment comprises: an MTC-IWF, an HSS, an HLR, a Short Message Service-Service Centre (SMS-SC), or an IP-Short-Message-Gateway (IP-SM-GW); and
the core network equipment comprises: a Mobility Management Entity (MME), a Serving General Packet Radio Service (GPRS), a Support Node (SGSN), a Mobile-services Switching Centre Gateway for Short Message Service (SMS-GMSC), a Short Message Service Router (SMS Router), or a Mobile-services Switching Centre (MSC).

12. The method according to claim 1, wherein
the network node equipment comprises: an MTC-IWF, an HSS, an HLR, a Short Message Service-Service Centre (SMS-SC), or an IP-Short-Message-Gateway (IP-SM-GW); and
the core network equipment comprises: a Mobility Management Entity (MME), a Serving General Packet Radio Service (GPRS), a Support Node (SGSN), a Mobile-services Switching Centre Gateway for Short Message Service (SMS-GMSC), a Short Message Service Router (SMS Router), or a Mobile-services Switching Centre (MSC).

13. The method according to claim 1, wherein
the network node equipment comprises: an MTC-IWF, an HSS, an HLR, a Short Message Service-Service Centre (SMS-SC), or an IP-Short-Message-Gateway (IP-SM-GW); and
the core network equipment comprises: a Mobility Management Entity (MME), a Serving General Packet Radio Service (GPRS), a Support Node (SGSN), a Mobile-services Switching Centre Gateway for Short Message Service (SMS-GMSC), a Short Message Service Router (SMS Router), or a Mobile-services Switching Centre (MSC).

14. A system for sending MTC device trigger information, comprising an MTC server, a network node equipment, a core network equipment and a target user equipment, wherein:
the MTC server is configured to set contents of the MTC device trigger information, and send the MTC device trigger information to the network node equipment;
the network node equipment is configured to search a core network equipment corresponding to the target user equipment, and forward the MTC device trigger information to the core network equipment;
the core network equipment is configured to forward the MTC device trigger information to the target user equipment via a Radio Access Network;
the target user equipment is configured to receive the MTC device trigger information, and send an MTC device trigger information acknowledgement message to the core network equipment;
wherein the contents of the MTC device trigger information comprises: an MTC device identifier and an MTC device trigger validity period;
wherein the MTC device identifier is an external identifier of 3rd Generation Partnership Project (3GPP) network, a corresponding internal identifier of the 3GPP network is International Mobile Subscriber Identity (IMSI), and the mapping between the external identifier and the internal identifier is configured to be completed by an MTC Interworking Function (MTC-IWF), or a Home Subscriber Server (HSS), or a Home Location Register (HLR); and
wherein the MTC server is further configured to send the MTC device trigger information to the network node equipment through the following process: deriving the internal identifier of the 3GPP network IMSI, according to the MTC device identifier in the contents of the MTC device trigger information, searching the network node equipment corresponding to the target user equipment according to the internal identifier of the 3GPP network IMSI, and sending the MTC device trigger information to the network node equipment.

15. The system according to claim 14, wherein the network node equipment is configured to receive a MTC device trigger information, modify the MTC device identifier in the contents of the MTC device trigger information to internal identifier of 3GPP network IMSI, search a core network equipment corresponding to the target user equipment via an HSS or an HLR, and send the MTC device trigger information to the core network equipment.

16. The system according to claim 14, wherein the target user equipment comprises a receiving unit and a sending unit, wherein
the receiving unit is configured to receive the MTC device trigger information sent by the core network equipment;
the sending unit is configured to send the MTC device trigger information acknowledgement message to the core network equipment.

17. A target user equipment, comprising a receiving unit and a sending unit, wherein
the receiving unit is configured to receive MTC device trigger information sent by a core network equipment, wherein the contents of the MTC device trigger information is set by an MTC server;
wherein the contents of the MTC device trigger information comprises: an MTC device identifier and an MTC device trigger validity period;
wherein the MTC device identifier is an external identifier of 3rd Generation Partnership Project (3GPP) network, a corresponding internal identifier of the 3GPP network is International Mobile Subscriber Identity (IMSI), and the mapping between the external identifier and the internal identifier is configured to be completed by an MTC Interworking Function (MTC-IWF), or a Home Subscriber Server (HSS), or a Home Location Register (HLR); and
wherein the MTC server is configured to derive the internal identifier of the 3GPP network IMSI, according to the MTC device identifier in the contents of the MTC device trigger information, search the network node equipment corresponding to the target user equipment according to the internal identifier of the 3GPP network IMSI, and send the MTC device trigger information to the network node equipment;
the sending unit is configured to send an MTC device trigger information acknowledgement message to the core network equipment.

* * * * *